(12) United States Patent
Han et al.

(10) Patent No.: US 11,199,153 B2
(45) Date of Patent: *Dec. 14, 2021

(54) FUEL INJECTION CONTROL APPARATUS AND METHOD FOR IMPROVING DEVIATION OF INJECTOR OPENING TIME

(71) Applicants: Hyundai Motor Company, Seoul (KR); Kia Motors Corporation, Seoul (KR)

(72) Inventors: Jung-Suk Han, Hwaseong-Si (KR); Chang-Jin Oh, Suwon-Si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/892,169

(22) Filed: Jun. 3, 2020

(65) Prior Publication Data

US 2021/0254576 A1 Aug. 19, 2021

(30) Foreign Application Priority Data

Feb. 17, 2020 (KR) ........................ 10-2020-0018891

(51) Int. Cl.

| F02D 41/40 | (2006.01) |
|---|---|
| F02M 51/06 | (2006.01) |
| F02D 41/22 | (2006.01) |
| F02M 65/00 | (2006.01) |
| F02D 41/32 | (2006.01) |
| F02D 41/38 | (2006.01) |

(52) U.S. Cl.
CPC .......... *F02D 41/401* (2013.01); *F02D 41/22* (2013.01); *F02D 41/32* (2013.01); *F02D 41/402* (2013.01);

(Continued)

(58) Field of Classification Search
CPC ........ F02D 41/401; F02D 41/32; F02D 41/22; F02D 41/402; F02D 2200/0602;

(Continued)

(56) References Cited

U.S. PATENT DOCUMENTS 4,278,061 A * 7/1981 Werner ................. F02D 41/182
                                                    123/483
4,452,210 A * 6/1984 Sasayama ............... F02D 41/20
                                                    123/490

(Continued)

FOREIGN PATENT DOCUMENTS

JP      2015212536 A    * 11/2015
KR  10-2015-0114078 A     10/2015

(Continued)

*Primary Examiner* — Sizo B Vilakazi
*Assistant Examiner* — Brian R Kirby
(74) *Attorney, Agent, or Firm* — Morgan, Lewis & Bockius LLP

(57) ABSTRACT

A fuel injection control method of injecting fuel to a combustion chamber through an injector, the method may include performing, by a controller electrically-connected to the injector, a main injection configured of controlling the injector to inject the fuel in a target injection fuel amount; and performing, by the controller, a pre-energizing configured of driving the injector to inject the fuel in advance, before the performing of the main injection with a predetermined idle time interposed therebetween, wherein the performing of the pre-energizing is configured of magnetizing an injector coil of the injector by applying a current to the injector during a predetermined pre-energizing time, in which a flow rate of the fuel is prevented from being generated by the pre-energizing.

16 Claims, 12 Drawing Sheets

(52) U.S. Cl.
CPC ........ *F02M 51/0603* (2013.01); *F02M 65/00* (2013.01); *F02D 2041/227* (2013.01); *F02D 2041/389* (2013.01); *F02D 2200/021* (2013.01); *F02D 2200/0602* (2013.01)

(58) Field of Classification Search
CPC ......... F02D 2041/227; F02D 2041/389; F02D 2200/021; F02D 2041/2044; F02D 41/20; F02M 51/0603; F02M 65/00
USPC ........................................................ 123/446
See application file for complete search history.

(56) References Cited

U.S. PATENT DOCUMENTS

| | | | | |
|---|---|---|---|---|
| 6,024,064 | A * | 2/2000 | Kato | F02D 41/065 123/179.17 |
| 6,766,788 | B2 * | 7/2004 | Xu | F02D 41/20 123/490 |
| 2008/0087254 | A1 * | 4/2008 | Tanaka | F02D 41/20 123/472 |
| 2009/0071443 | A1 * | 3/2009 | Miyake | F02D 41/20 123/446 |
| 2009/0177367 | A1 * | 7/2009 | Toyohara | F02D 41/20 701/103 |
| 2015/0144109 | A1 * | 5/2015 | Mukaihara | F02D 41/2467 123/490 |
| 2015/0184626 | A1 * | 7/2015 | Denk | F02D 41/30 123/478 |
| 2015/0275814 | A1 | 10/2015 | Park et al. | |
| 2016/0363078 | A1 * | 12/2016 | Nakano | F02D 41/40 |
| 2019/0010889 | A1 * | 1/2019 | Ferrara | F02D 41/2467 |

FOREIGN PATENT DOCUMENTS

| KR | 10-2016-0096491 A | 8/2016 |
|---|---|---|
| KR | 10-1684509 B1 | 12/2016 |

* cited by examiner

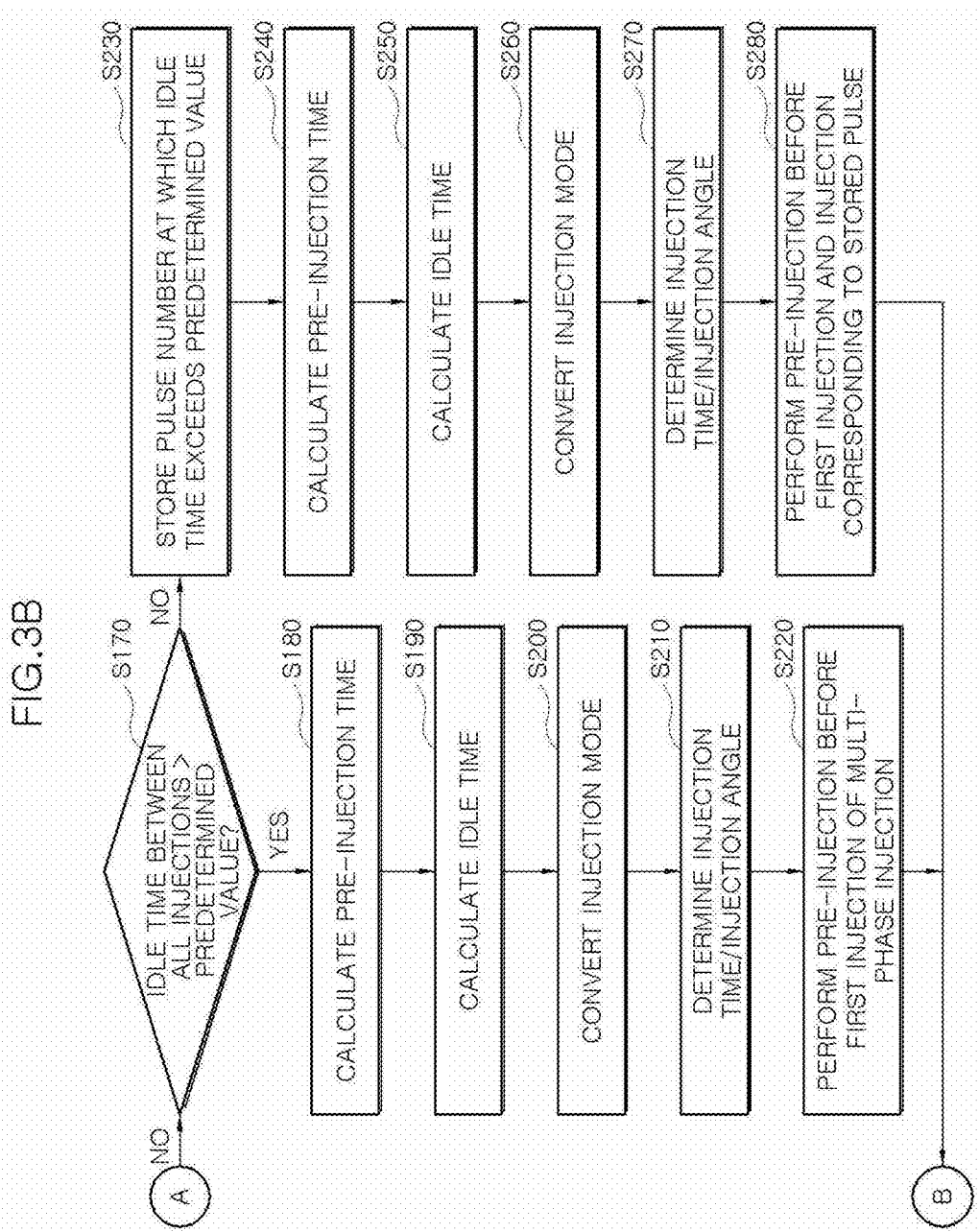

FUEL INJECTION CONTROL APPARATUS AND METHOD FOR IMPROVING DEVIATION OF INJECTOR OPENING TIME

CROSS-REFERENCE TO RELATED APPLICATION

The present application claims priority to Korean Patent Application No. 10-2020-0018891, filed on Feb. 17, 2020, the entire contents of which is incorporated herein for all purposes by this reference.

BACKGROUND OF THE PRESENT INVENTION

Field of the Invention

The present invention relates to a fuel injection control apparatus and method, and more particularly, to a fuel injection control apparatus and method, which may improve the deviation of an injector opening time in the low flow rate section of fuel.

Description of Related Art

When fuel is supplied to an engine, the supplied fuel amount is determined by a controller (ECU), and the fuel is injected into the engine by an injector by the determined demand amount of fuel to be supplied into the engine.

FIG. 11 illustrates the conventional injector, and a needle valve 120b is formed inside a housing 120a of the injector 120, and an armature 120c, a coil 120d, a spring 120e, and the like for operating the needle valve 120b are formed therein. The needle valve 120b is repeatedly moved back and forth by the operation of the amateur 120c to block or open a nozzle 120f formed at the end portion of the housing 120a. That is, when a current is applied to the coil 120d, the armature 120c is operated to pull the needle valve 120b, and when the current is cut off, the needle valve 120b is formed to return to the original location by the elasticity of the spring 120e.

The injector is provided for each cylinder to receive a fuel injection signal from a controller to inject fuel during a predetermined injection time, supplying the fuel into the engine by the demand fuel amount.

In general, the injector has a unique injector drive characteristic difference for each type or company thereof. For example, the injector closing demand time based on the demand fuel amount relative to fuel pressure, or the injector closing demand time and the injection command time corresponding thereto have a specific correspondence relationship for each type or company of the injector. Generally, such characteristic information is stored in a memory inside the controller when the vehicle is manufactured, and used to supply fuel into each cylinder by the demand amount of fuel.

However, even in the case of the same injector, the injector drive characteristics may vary due to a manufacturing tolerance, a tolerance of the output phase which operates the injector in the controller, and a difference between the operating current profiles thereby. When the deviation of the injector drive characteristics related to the injector opening time and closing time for each cylinder is not compensated appropriately, a deviation of the opening time and the closing time between the injectors occurs for each cylinder, and despite the injection command based on the same injection time, different amounts of fuel are supplied for each cylinder. That is, the same flow rate control between cylinders becomes difficult.

In recent years, the open sensing calculation of the injector in the GDI engine using high pressure becomes a problem. In general, as the injection mode has multi-phases to reduce particulate matter or increase combustion efficiency, the injection time is rapidly reduced for each injection of the multi-phase injection. As illustrated in FIG. 10, the injection which utilizes a very small fuel amount injection section (A) (so-called ballistic section) in which the fuel amount (m) is rapidly increased even if an injector operating time ($T_i$) is slightly changed is also being performed.

The reason of calculating the opening time of the injector is because, as described above, there is a deviation from after an injection signal is electrically applied for each injector to a point where the flow rate actually comes out. In the case of the deviation of the opening time, the deviation amount is relatively smaller than that of the deviation of the closing time, but is an important factor because it largely affects the flow rate in a section where the injection time is very short as in the aforementioned low flow rate section. Accordingly, it was conventionally important to calculate the opening time and to compensate the deviation of the opening time by use of the result thereof.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

FIG. 9 is a graph illustrating the relationship between an injector opening duration, which is a duration in which the actual fuel is injected from the injector, the current applied to the injector, and the voltage generated from the injector. Referring to FIG. 9, the horizontal axis represents a time, and the vertical axis represents the magnitudes of the current and the voltage, and the fuel amount injected from the injector.

In FIG. 9, a section (a) means a dead stroke of the needle of the injector, and means a section in which the needle moves by the current applied to the injector but the actual fuel injection nozzle is not opened.

For the injector to inject fuel, the needle needs to be lifted, and to lift the needle, a current needs to be applied to a solenoid or piezo side to magnetize a coil. To apply the current, an initial signal is generated, a current is applied to the solenoid or piezo side of the injector at a constant delay time from the initial signal, and the magnitude of the current gradually increases, reaching a current peak, as illustrated in FIG. 9.

Furthermore, as illustrated in FIG. 9, the current has a route where the current is increased to reach a current peak point, and is decreased again, and at a time point at which a certain time has elapsed from the current peak (injector opening time point), the needle is lifted, and the needle is in a lifted state during the injector opening duration from the injector opening time point (state where the actual fuel is injected).

However, since there is no particular change in voltage or current at the opening time point of the injector, conventionally, a typical method could not sense the opening time of the injector accurately. Accordingly, the injector closing time point has been conventionally used to find the injector opening time. A time point when the closing time point is firstly generated by gradually increasing the fuel injection time from a very short time period has been determined as the opening time point, and the actual opening time has been determined by comparing the present value with that of each injector or a master injector.

Furthermore, the injector closing time is measured by use of a reverse voltage signal generated by the injector. As illustrated in FIG. 9, the voltage generated by the injector tends to increase and decrease rapidly at the initial stage where the current is applied to the injector, and then increase again. Furthermore, thereafter, the voltage suddenly decreases again at the time point at which the current application to the injector becomes OFF, and after a predetermined time delay (section (b), about 0.1 ms), the voltage rapidly increases again. As illustrated in FIG. 9, an inflection point exists in the voltage curve in the section where the voltage increases again (section (c)), and the time point at which the inflection point exists becomes a time point at which the needle of the injector is closed to terminate the fuel injection (injector closing time). Accordingly, when the time point at which the inflection point exists is detected by performing the secondary differentiation for the voltage curve, the injector closing time may be sensed.

However, based on the characteristics of the injector, even though the injector is actually opened, there is a case where the inflection point is not clearly recognized. The inflection point is caused by the change in the speed of the needle when the needle of the injector goes downward and the injector is closed while the magnetization of the coil of the injector disappears. This phenomenon appears to be in a signal at the low side and high side of the injector. That is, even if the needle of the injector is closed at the same height, the inflection point is more visible in the case of the injector with a fast injector closing speed. As described above, since the injector opening time is sensitive to the closing characteristic of the injector, the inflection point is not well distinguished in the injector having a poor closing characteristic or an uneven opening characteristic.

Accordingly, since it has been difficult to accurately detect the opening time of the injector, it has been difficult to perform the same flow rate control between cylinders by improving the deviation of the opening time based on the detected opening time.

Various aspects of the present invention are directed to providing a fuel injection method and apparatus, which may stably improve the performance of the injector by improving the deviation of the opening time for each cylinder even without detecting the opening time point for each cylinder.

Unlike the related art, the present invention magnetizes a magnetic coil of an injector in advance immediately before injecting fuel without directly determining and estimating the opening time point of the injector for improving the deviation of the opening time point, improving the deviation of the opening time point by facilitating the injector to be opened as fast as possible when the actual injection is performed. According to an exemplary embodiment of the present invention, it is possible to reduce a magnetization time of the coil which is a factor having the greatest effect on the opening time point of the injector, advancing the opening time point of the injector, and accordingly, reducing the deviation of the opening between the injectors.

A fuel injection control method according to an exemplary embodiment of the present invention for achieving the object, as the fuel injection control method of injecting fuel to a combustion chamber through an injector, includes performing, by a controller electrically-connected to the injector, a main injection configured of controlling the injector to inject the fuel in a determined target injection fuel amount, and performing, by the controller, a pre-energizing configured of driving the injector to inject the fuel in advance, before the performing of the main injection with a predetermined idle time interposed therebetween, and the performing of the pre-energizing is configured of magnetizing an injector coil of the injector by applying a current to the injector during a predetermined pre-energizing time, in which a flow rate of the fuel is prevented from being generated by the pre-energizing.

The performing of the pre-energizing further includes determining the predetermined pre-energizing time and predetermined the idle time according to a fuel pressure and an engine temperature.

The performing of the pre-energizing further includes determining whether the main injection is a single injection or a multi-phase injection, and when the controller determines the main injection as the single injection, an injection mode of the fuel is converted into a multi-phase injection, a first injection of the multi-phase injection is set to the pre-energizing, and a second injection of the multi-phase injection is set to the main injection.

An injection mode of the first injection is an End of Injection (EOI) based on a fuel injection angle determined in an exhaust stroke region.

An injection mode, an injection time, and an injection angle of the second injection are determined as an injection mode, an injection time, and an injection angle of an existing main injection.

The method further includes, when the main injection is determined as the multi-phase injection, determining whether idle times between the injections of the multi-phase injection exceed a predetermined value, and when all of the idle times between the injections of the multi-phase injection are equal to or less than the predetermined value, it is not necessary to perform the pre-energizing between the multi-phase injections, such that the pre-energizing is performed only before the first injection of the multi-phase injection.

When at least any one of the idle times between the injections of the multi-phase injection exceeds the predetermined value, it is necessary to magnetize the coil by performing the pre-energizing before the corresponding injection, such that the pre-energizing is performed before the corresponding injection, in every first injection of the multi-phase injection and every injection after the idle time which exceeds the predetermined value.

The injection mode upon the pre-energizing is an injection of the fuel according to a fuel injection angle determined in an exhaust stroke region.

An injection mode, an injection time, and an injection angle upon each injection in the multi-phase injection are determined as an injection mode, an injection time, and an injection angle upon each injection in an existing multi-phase injection.

The method determines whether a limp home mode, in which the fuel is injected in a forced low pressure mode, is being executed due to malfunction of a high pressure fuel pump of a fuel system, and stops performing the performing of the pre-energizing, when the controller determines that the limp home mode is being executed.

A fuel injection control apparatus according to an exemplary embodiment of the present invention for achieving the object includes an injector which is configured to inject fuel to a cylinder of an engine; and a controller which controls the injector so that the fuel is injected from the injector by a target injection fuel amount, and at the present time, the controller is configured to perform a pre-injection control, in which an injector coil of the injector is magnetized by applying a current to the injector during a predetermined pre-energizing time, in which flow rate of the fuel is prevented from being generated, with a predetermined idle time interposed therebetween, before a main injection in which the target injection fuel amount of the fuel is injected in the cylinder.

The controller includes a pre-energizing time and idle time calculator which is configured of determining the predetermined pre-energizing time and the predetermined idle time; an injection mode calculator which is configured of determining an injection time and an injection angle of the injector upon the pre-energizing and the main injection based on the number of injection times, an injection time and an injection angle of the injector upon the main injection, and a result determined by the pre-energizing time and idle time calculator; and an injector drive driver which controls the injection angle and the injection time of the injector, according to a determined result of the injection mode calculator.

The pre-energizing time and idle time calculator is configured to determine the predetermined pre-energizing time and the predetermined idle time according to a fuel pressure measured by a fuel rail pressure sensor and an engine temperature measured by a coolant sensor.

According to an exemplary embodiment of the present invention, it is possible to improve the deviation of the opening time between the standalone injectors even without detecting the injector opening time. Accordingly, even in the case where the injector opening time may not be stably determined because the injector closing time has been incorrectly determined, or the relationship between the injector closing time and the injector opening time may not be specified with respect to all injectors mounted to each of the plurality of cylinders, it is possible to improve the deviation of the injector opening time.

As a result, the initial flow rate development behavior of the injector may be improved, and the opening time point of the injector may be advanced, effectively performing the low flow rate control. Furthermore, even when the injection time is increased, the injector opening time point becomes constant, and the difference in the opening time points between the standalone injectors may be reduced, effectively performing the low flow rate control in the ballistic section.

BRIEF DESCRIPTION OF THE DRAWINGS

FIG. 3A and FIG. 3B are flowcharts illustrating the fuel injection control method according to an exemplary embodiment of the present invention.

Figure 1:
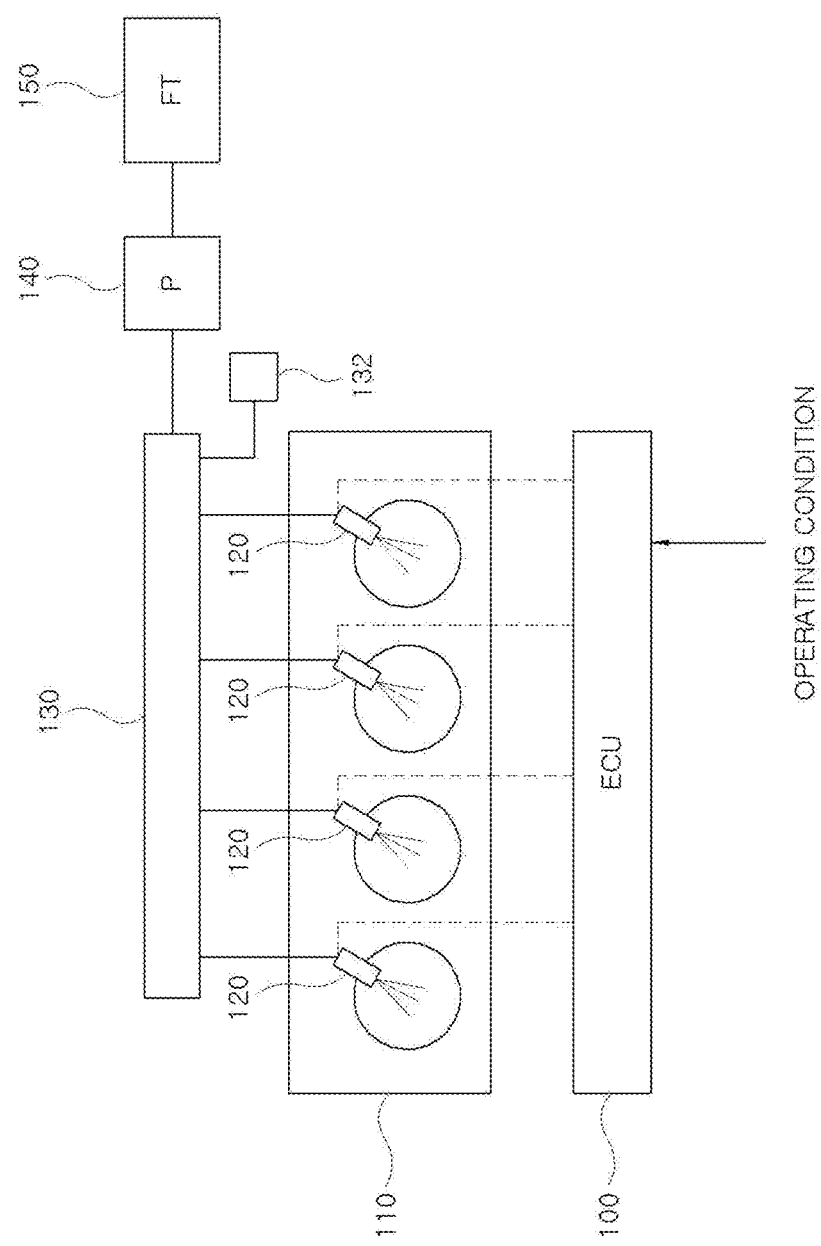
FIG. 1 is a schematic block diagram of a fuel injection system in which a fuel injection control method according to an exemplary embodiment of the present invention is performed.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a fuel injection control method and apparatus according to exemplary embodiments of the present invention will be described with reference to the accompanying drawings.

FIG. 1 is a schematic block diagram of a fuel injection system in which a fuel injection control method according to an exemplary embodiment of the present invention is performed.

Referring to FIG. 1, a control system of an injector includes a fuel tank 150, a fuel pump 140, a rail 130, a pressure sensor 132, an injector 120, an engine 110, and a controller 100.

The fuel tank 150 is filled with fuel used for an internal combustion engine, and the fuel pump 140 pumps the fuel contained in the fuel tank 150 to the rail. The pressure sensor 132 which detects the pressure inside the rail 130 is mounted, and a separate regulator valve and a return line are formed in the rail 130.

The fuel pumped to the common rail 130 is distributed to the injector 120, and the injector 120 is mounted corresponding to each cylinder to inject fuel into a combustion chamber of the engine 110.

The controller 100 may set the demand injection fuel amount based on the operation condition, for example, the RPM of the engine and the accelerator pedal signal, and control the injection command time of the injector in a response to the set demand injection fuel amount. Furthermore, the controller 100 is configured to perform a pre-energizing control, in which an injector coil of the injector is magnetized by applying a current to the injector during a predetermined pre-energizing time, which prevents the flow of the fuel from being generated, with a predetermined idle time interposed therebetween, before the main injection of injecting the target injection fuel amount as described later.

Figure 2:
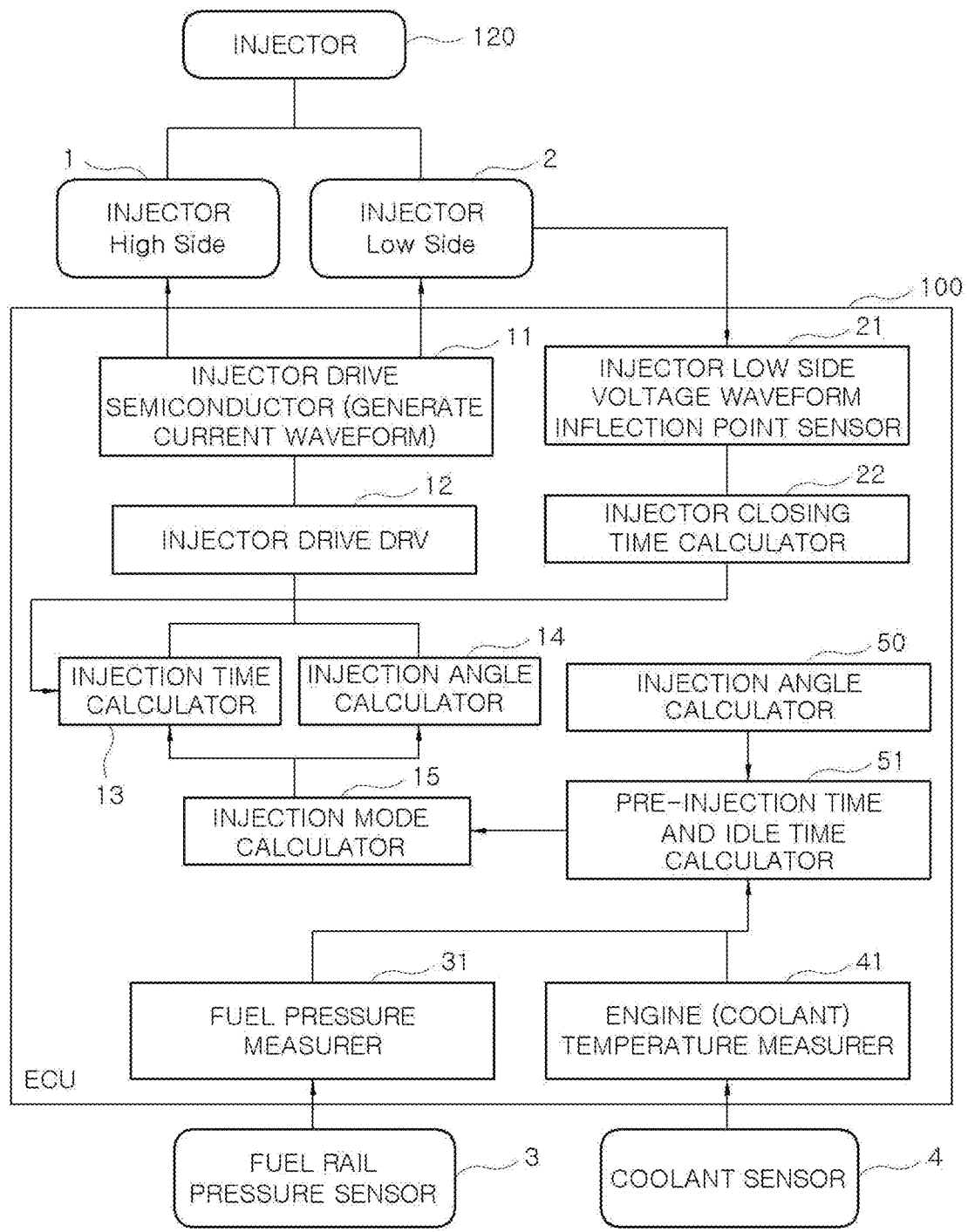
FIG. 2 is a block diagram illustrating a configuration of a fuel injection control apparatus according to an exemplary embodiment of the present invention.

FIG. 2 is a block diagram illustrating a configuration of a fuel injection control apparatus according to an exemplary embodiment of the present invention.

As illustrated in FIG. 2, a fuel injection control apparatus according to an exemplary embodiment of the present invention includes an injector 120 which injects fuel into a cylinder, and a controller 100 which controls the injector 120 so that the fuel is injected from the injector by the target injection fuel amount. The controller 100 is connected to a high side 1 and a low side 2 of the injector 120, respectively, for driving the injector 120.

An injector drive semiconductor 11 which is connected to the high side 1 and the low side 2 of the injector 120, respectively receives a drive command signal from an injector drive driver 12 to generate a current waveform and apply the pulse thereby to the high side 1 and the low side 2 of the injector 120, driving the injector 120.

Figure 9:
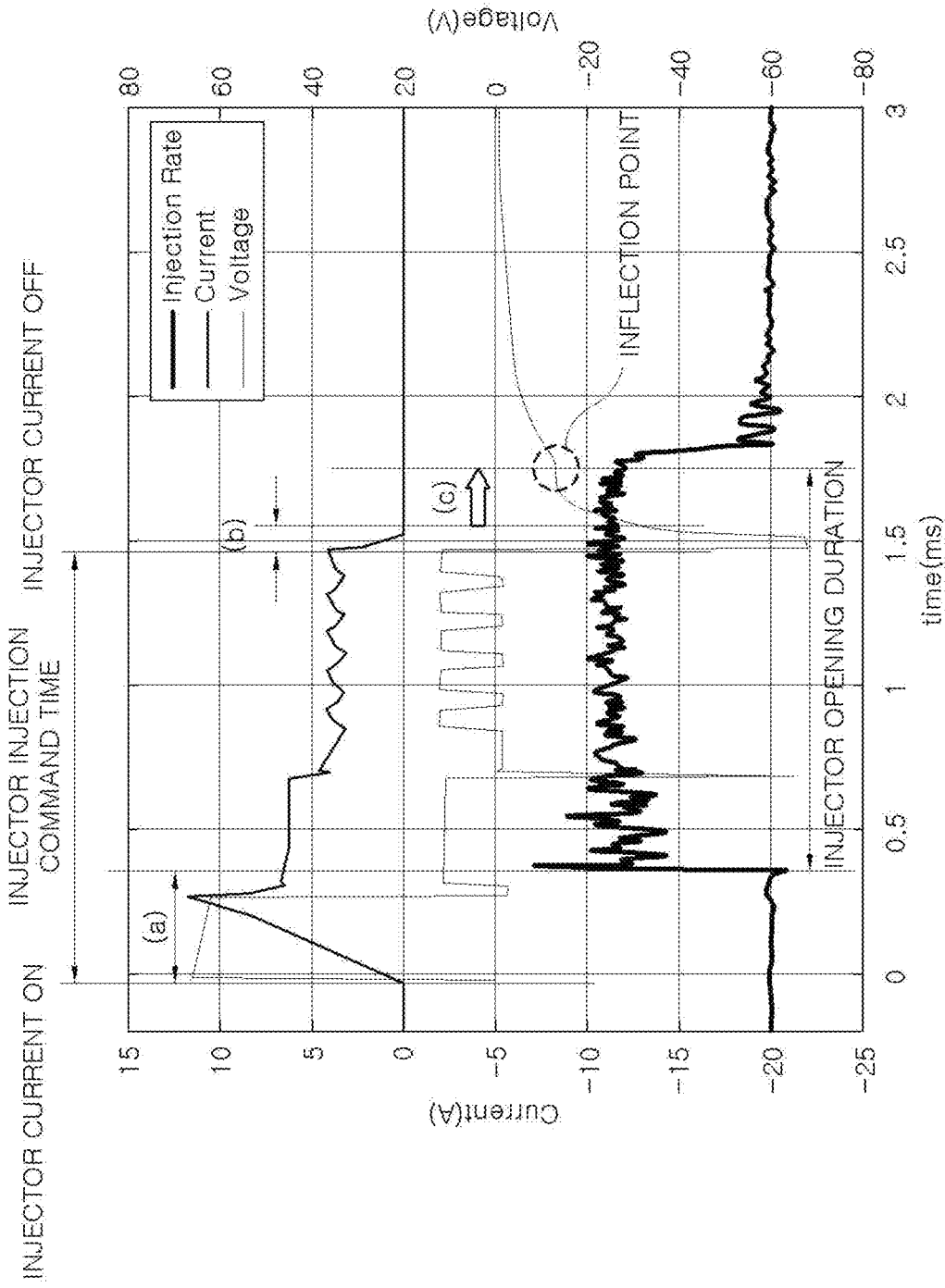
FIG. 9 is a graph illustrating the relationship between an injector opening duration, which is a duration during which the actual fuel is injected from the injector, a current applied to the injector, and a voltage generated from the injector.
Figure 10:
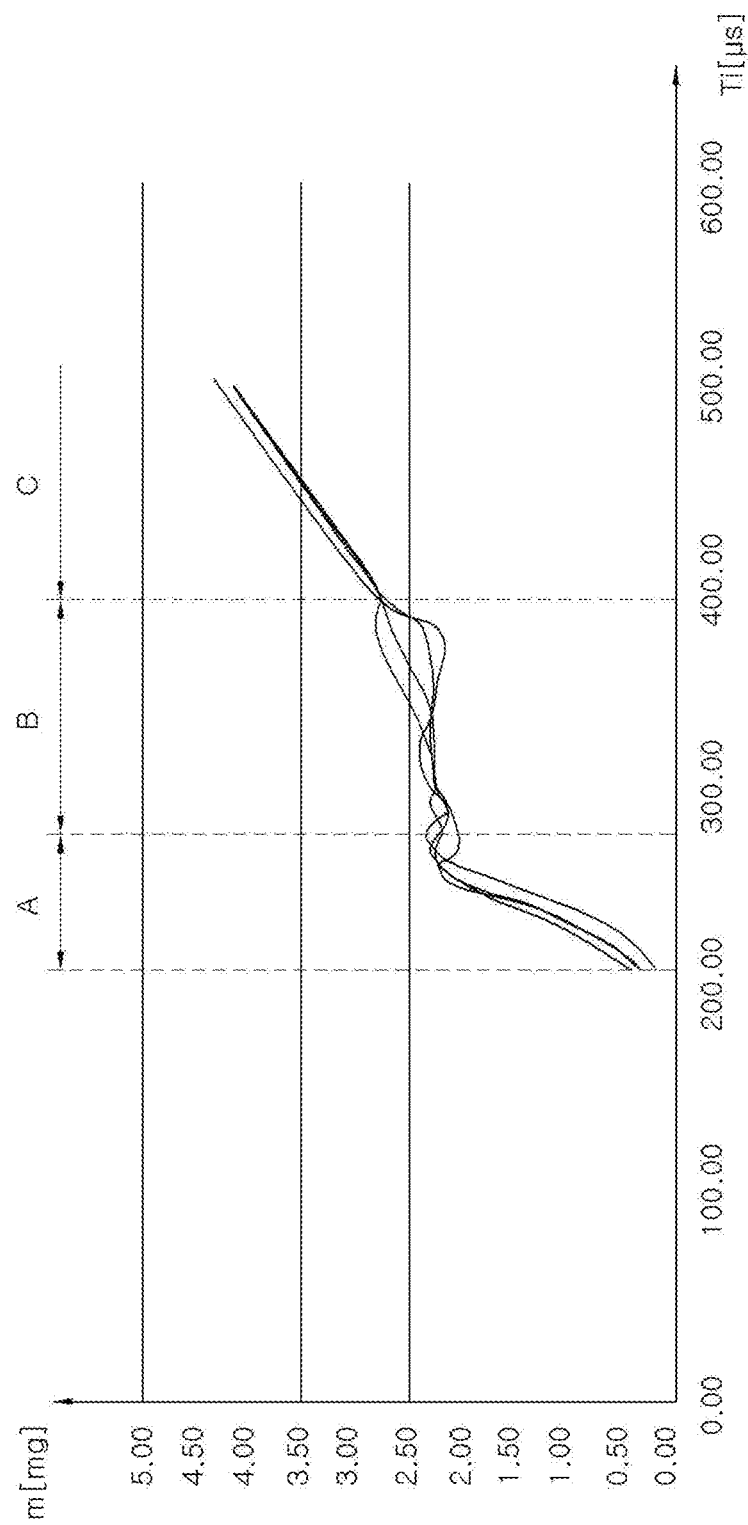
FIG. 10 is a graph illustrating the change in a fuel amount (m) based on an injector operating time ($T_i$) for each section.
Figure 11:
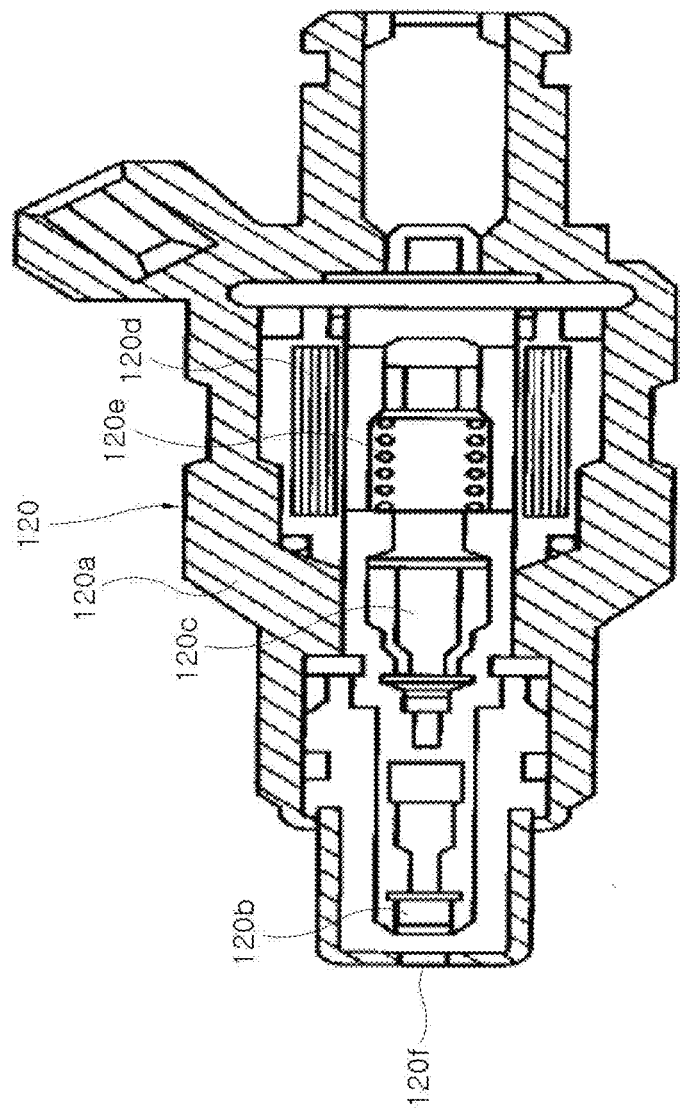
FIG. 11 is a cross-sectional diagram illustrating a configuration of the injector.

Meanwhile, when the injection by the injector 120 is terminated, only the low side is activated so that the counter electromotive current from the injector 120 flows to the low side thereof. Accordingly, an injector low side voltage waveform inflection point sensor 21 of the controller 100 receives the voltage signal of the counter electromotive current from the low side 2 of the injector 120 to generate a voltage waveform, and detects the inflection point of the voltage waveform illustrated in FIG. 9.

An injector closing time calculator 22 determines the closing time of the injector 120 based on the location of the inflection point which is detected by the injector low side voltage waveform inflection point sensor 21.

A pre-injection requestor 50 transmits a pre-injection request signal for allowing the drive current having a predetermined pulse to be applied to the injector 120 to magnetize a coil 120d of the injector 120 in advance, before the main injection for injecting the target injection fuel amount, when it is necessary to reduce the deviation of the opening time of the injector 120. As the condition requiring the pre-energizing, there may be a case where a high pressure fuel pump 140 is operated normally, and the main injection injects the fuel of the low flow rate corresponding to the ballistic section, rather than a forced low pressure injection mode by a limp home mode.

A pre-energizing time and idle time calculator 51 receives the pre-injection request signal from the pre-injection requestor 50 to determine the pre-energizing time required for the pre-energizing and the idle time between the pre-energizing and the main injection.

Figure 4:
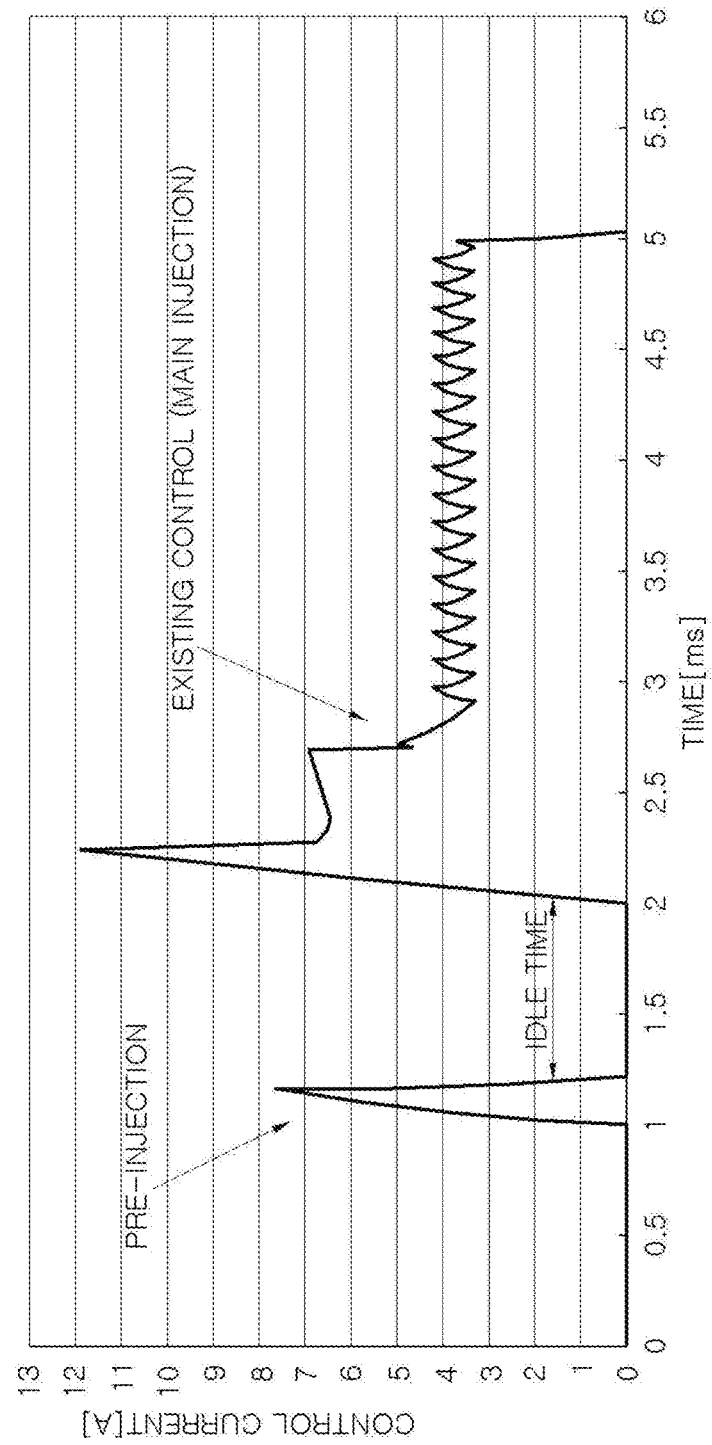
FIG. 4 is a graph illustrating the change in an injector control current amount with the time when the fuel injection control method according to an exemplary embodiment of the present invention is performed.

Fuel of the target injection fuel amount is injected into the combustion chamber of the engine 110 through the main injection after the pre-energizing, and the pre-energizing is not intended for supplying fuel, but is for magnetizing the coil 120e of the injector 120 in advance before the main injection to reduce the time required for magnetizing the coil 120e upon the main injection, rapidly opening the injector 120. Accordingly, as also illustrated in FIG. 4, the supply time of the control current supplied to the injector 120 upon the pre-energizing is limited within a range in which the flow rate of the actual injection fuel is not generated. At the instant time, the representative value of the maximum pre-energizing time may be defined by use of the injector having the fastest opening of the injector measured from a flowmeter among a plurality of injectors as a representative sample.

The idle time is a time interval between the pre-energizing and the main injection. As the time interval between the pre-energizing and the main injection is larger, the magnetization of the coil 120e generated by the pre-energizing disappears, such that an effect of the pre-energizing is eliminated. Accordingly, the idle time is set to a time until the magnetization generated in the coil 120e due to the current applied to the injector 120 upon the pre-energizing disappears after the pre-energizing.

The pre-energizing time and idle time calculator 51 determines the pre-energizing time and the idle time through the fuel pressure and the temperature of the engine, which are received through a fuel rail pressure sensor 3 and a coolant sensor 4. As the fuel pressure is higher, the pre-energizing time needs to be increased, and the idle time is also lengthened. On the other hand, as the fuel temperature is higher, the idle time between the pre-energizing and the main injection is shortened.

The pre-energizing time and the idle time are stored in advance in the controller 100 in a form of a two-dimensional table related to the engine temperature and the fuel pressure, and may be determined by use of the fuel pressure and the engine temperature, which are measured from the fuel rail pressure sensor 3 and the coolant sensor 4, and the stored table.

An injection mode calculator 15 includes an injection time calculator 13 and an injection angle calculator 14 to determine the number of injection times (single injection or multi-phase injection), an injection time (supply time of the current applied to the injector), and an injection angle (the time point at which the current is applied to the injector), and to transmit the determined result to the injector drive driver 12. The injection mode calculator 15 determines the target injection fuel amount which may satisfy a target air-to-fuel ratio, and accordingly, determines the number of injection times, the injection time, and the injection time point upon the main injection. Furthermore, the injection mode calculator 15 receives information on the pre-energizing time and the idle time determined by the pre-energizing time and idle time calculator 51 to determine the drive time point and drive time of the pre-energizing performed before the main injection.

The injector drive driver 12 generates a drive signal by use of the information related to the number of injection times, the injection time, and the injection angle determined by the injection mode calculator 15, and transmits the drive signal to the injector drive semiconductor 11.

The controller 100 may be implemented in a form of a computer provided in the vehicle. In that case, the controller 100 may be implemented by recording a program for implementing the present control function on a computer-readable recording medium, and reading and executing the program recorded on the present recording medium in a computer system. Furthermore, the "computer system" used here is a computer system built in the vehicle, and includes hardware, such as an OS or a peripheral device. The "computer readable recording medium" refers to a memory device such as a portable medium such as a flexible disk, an optical magnetic disk, a ROM, or a CD-ROM, or a hard disk built into a computer system. Furthermore, the "computer readable recording medium" may also include one which dynamically maintains a program for a short time, such as a communication line when transmitting a program through a network such as the Internet or a communication line such as a telephone line, or one which maintains the program during a certain time, such as a volatile memory inside the computer system which becomes a server or a client in that case. The program may be one which may implement a portion of the aforementioned functions, or one which may implement the aforementioned functions in combination with a program previously recorded in the computer system.

Furthermore, some or all models of the controller 100 in the aforementioned embodiments may be implemented as an integrated circuit such as a Large Scale Integration (LSI). Each model of the controller 100 may become individually processorization, and may also become processorization by integrating some or all models of the controller 100. Furthermore, the method of producing the integrated circuit is not limited to the LSI, but may be implemented by a dedicated circuit or a general purpose processor. Furthermore, when the technology of producing the integrated circuit which replaces the LSI appears to be with the advance of a semiconductor technology, the integrated circuit according to the technology may be used.

Figure 3A:
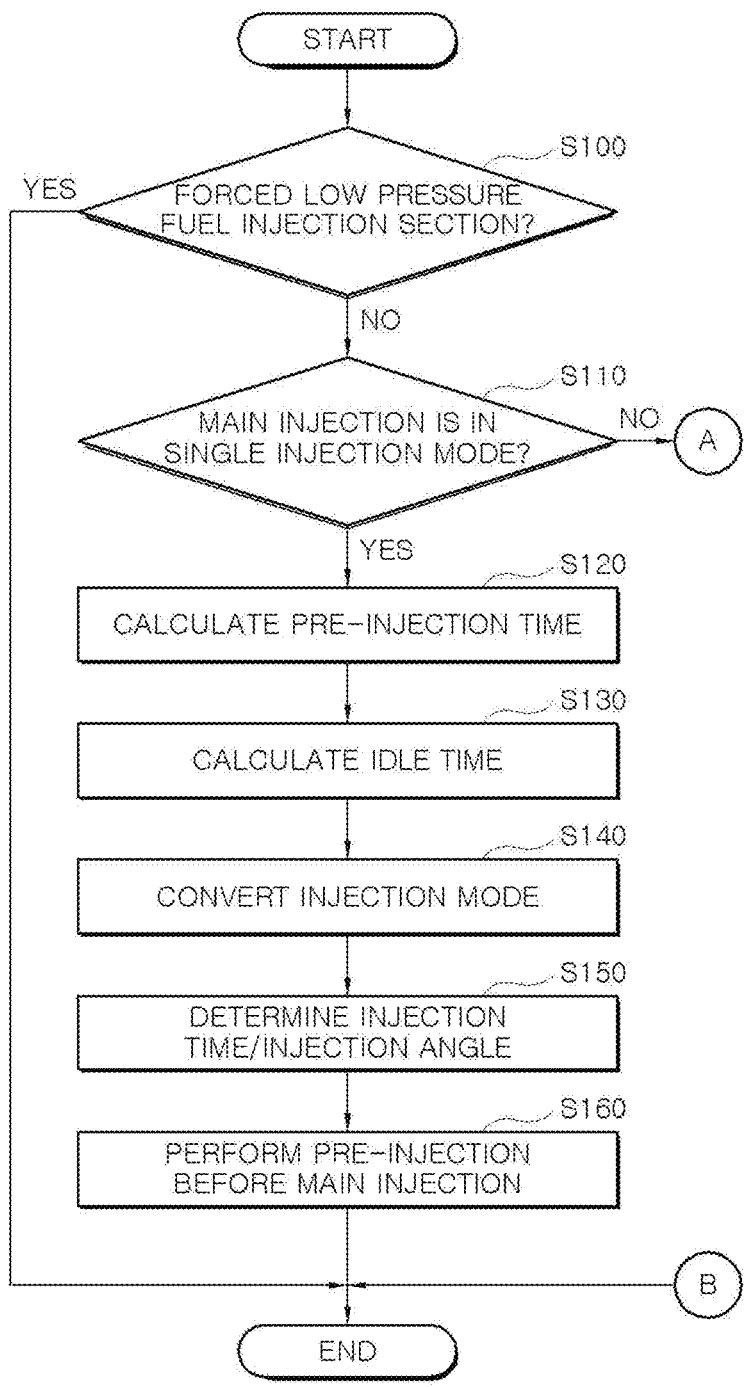

FIG. 3 is a flowchart illustrating a fuel injection control method according to an exemplary embodiment of the present invention, which is performed by the fuel injection control apparatus illustrated in FIG. 2.

According to FIG. 3, the pre-injection requestor 50 of the controller 100 determines whether the current fuel injection section corresponds to the forced low pressure fuel injection section in the limp home mode (S100). To perform the pre-energizing before the main injection, the high pressure fuel pump 140 basically needs to be operated normally. Accordingly, first, the pre-injection requestor 50 determines whether the current fuel injection section corresponds to the forced low pressure fuel injection section due to the malfunction of the high pressure fuel pump 140, and performs the pre-injection logic to be described later when the high pressure fuel pump 140 is normally operated.

When the high pressure fuel pump 140 is in normal operation, and the pre-injection requestor 50 transmits a pre-injection request signal because it is necessary to perform the pre-energizing to reduce the deviation of the opening time for each injector, the injection mode calculator 15 determines whether the injection mode upon the existing main injection is a single injection mode or a multi-phase injection mode (S110).

When it is determined that the main injection is in the single injection mode, the pre-energizing time and idle time calculator 51 of the controller 100 determines the pre-energizing time which is a time to apply the current to the injector 120 upon the pre-energizing (S120). As described above, the pre-energizing time is a time within a range in which the flow rate of the actual fuel is not generated, and may be determined through the currently measured fuel pressure and engine temperature and a table stored in the controller 100.

Furthermore, the pre-energizing time and idle time calculator 51 of the controller 100 determines the idle time which is a time interval between the pre-energizing and the main injection (S130). The idle time is a time which is required until the armature 120c moving upward by the current supply upon the pre-energizing moves downward again for the main injection, and is a time before the magnetization of the coil 120e generated by the pre-energizing all disappears. As described above, the idle time may also be determined through the currently measured fuel pressure and engine temperature and a table stored in the controller 100.

When the pre-energizing time and the idle time are determined by the pre-energizing time and idle time calculator 51, the injection mode calculator 15 converts a single injection mode into a double injection mode, in which a first injection is the pre-energizing and a second injection is the main injection, so that the pre-energizing is performed based on the pre-energizing time and the idle time determined by the pre-energizing time and idle time calculator 51, before the main injection (S140). At the instant time, the injection mode in the first injection is an End of Injection (EOI) based on the fuel injection angle determined in an exhaust stroke region, and the injection mode upon the existing main injection is applied to the second injection as it is.

Furthermore, the injection mode calculator 15 determines the injection time and the injection angle upon the first injection and the second injection in the double injection mode (S150).

At the present time, the injection time of the second injection which is the main injection is set to the injection time upon the existing main injection as it is. Furthermore, the injection time of the first injection which is the pre-energizing and the idle time between the first injection and the second injection are set to a value determined in the steps S120 and S130. Furthermore, even in the case of the injection angle, the injection angle of the second injection which is the main injection is set to the injection angle upon the existing main injection as it is. Furthermore, the first injection which is the pre-energizing is performed before the main injection with the determined idle time interposed therebetween, such that it is unnecessary to determine the injection angle separately.

When the injection time and the injection angle upon the first injection and the second injection in the double injection mode are determined by the injection mode calculator 15, the injector drive driver 12 generates a drive signal by use of information related to the number of injection times, the injection time, and the injection angle, which are determined by the injection mode calculator 15 and transmits the drive signal to the injector drive semiconductor 11, driving the injector 120 (S160).

Meanwhile, when it is determined in step S110 that the existing main injection is in the multi-phase injection mode (S110: No), the injection mode calculator 15 determines whether the idle time between all the injections in the multi-phase injection has exceeded a predetermined value (S170). As described above, when the idle time between the injections is short, the magnetization of the coil 120e generated by the immediately preceding injection is all not lost yet, not requiring to perform the pre-energizing. On the other hand, when the idle time is longer than the time (predetermined value) at which magnetization remains in the coil 120e, it is necessary to perform the pre-energizing before the corresponding injection. Accordingly, the injection requiring the pre-energizing is determined by comparing the idle time between the plurality of injections configuring the multi-phase injection with the predetermined value. The predetermined value at the present time is different from the idle time value determined in S190 to be described later. Accordingly, the time until the magnetization is fully removed after a specific injection time (for example, 0.5 ms, 1 ms, 2 ms, 5 ms, or the like) in the injector sample with the earliest opening time is stored in the controller 100 in a separate calibration table as a predetermined value.

If it is determined in step S170 that the idle time between the injections is equal to or less than the predetermined value in all the injections of the multi-phase injection (S170: YES), it is not necessary to perform the pre-energizing during the multi-phase injection. Accordingly, in the instant case, the coil 120e may be magnetized before a first injection by performing the pre-energizing only before the first injection of the multi-phase injection.

To this end, the injection mode calculator 15 determines the pre-energizing time and the idle time, as in steps S120 and S130 (S180, S190).

Furthermore, the injection mode calculator 15 converts the injection mode (S200). That is, when the conventional main injection was n-phase injection, the injection mode is converted to (n+1)-phase injection including the pre-energizing. At the instant time, the injection mode in the first injection of the (n+1)-phase injection, which is the pre-energizing, is the injection (EOI) based on the fuel injection angle determined in the exhaust stroke region, and the injection mode of 1~n-phase injection upon the existing main injection is applied to the injection mode of the injection (2~n+1-phase injection) after the first injection as it is.

Furthermore, the injection mode calculator 15 determines the injection time and the injection angle of each injection in the (n+1)-phase injection mode (S210).

At the present time, the injection time after the second injection, which is the main injection, is set to the injection time in the existing n-phase injection mode as it is. Furthermore, the injection time of the first injection, which is the pre-energizing, and the idle time between the first injection and the second injection are set to values determined in steps S180 and S190.

Furthermore, even in the case of the injection angle, the injection angle upon the injection after the second injection, which is the main injection, is set to the injection angle of the existing n-phase injection mode as it is, respectively. For example, the injection time and the injection angle of the third injection upon the n-phase injection are set to the injection time and the injection angle of the fourth injection upon the (n+1)-phase injection. Furthermore, since the first injection, which is the pre-energizing, is performed before the second injection with the determined idle time interposed therebetween, it is not necessary to determine the injection angle separately.

When the injection time and the injection angle of each injection in the (n+1)-phase injection mode are determined by the injection mode calculator 15, the injector drive driver 12 generates a drive signal by use of information on the number of injection times, the injection time, and the injection angle, which are determined by the injection mode calculator 15 and transmits the drive signal to the injector drive semiconductor 11. As a result, the injector 120 is driven to perform the pre-energizing before the first injection of the existing n-phase injection (S220).

In step S170, when it is determined that the idle time exceeds a predetermined value in at least any one of the injections upon the existing multi-phase injection (S170: No), the injection mode calculator 15 stores all pulse numbers of the injection at which the idle time from the immediately preceding injection exceeds the predetermined value (S230). This is because the magnetization of the coil 120e generated by the immediately preceding injection has disappeared in the case of the injection of the corresponding pulse number, such that it is necessary to magnetize the coil again by performing the pre-energizing immediately before the magnetization disappears. For example, when the existing main injection is a five-phase injection, and the idle time between the first phase and the second phase among them and the idle time between the fourth phase and the fifth phase exceed a predetermined value, the pulse numbers upon the second phase injection and the fifth phase injection are stored in the controller 100.

Next, the injection mode calculator 15 determines the pre-energizing time and the idle time similarly to steps S120, S130, S180, and S190 (S240, S250).

Furthermore, the injection mode calculator 15 converts the injection mode (S260). That is, when the existing main injection was the n-phase injection, the injection mode is converted to a (n+1+α)-phase injection including the pre-energizing. Here, the α refers to the number of injections in which the idle time from the immediately preceding injection exceeds the predetermined value, and for example, the aforementioned example where the idle time immediately before the second phase injection and the fifth phase injection exceeds the predetermined value has α=2, such that in the instant case, the five-phase injection mode is switched to an eight-phase injection mode. At the instant time, the injection mode in the pre-energizing including the first injection of the (n+1+α)-phase injection mode is the injection (EOI) based on the fuel injection angle determined in the exhaust stroke region, and the injection mode of the 1-n phase injection in the existing n-phase injection mode is applied to the injection mode of the injection except for the pre-energizing as it is.

Furthermore, the injection mode calculator 15 determines the injection time and the injection angle of each injection in the n+1+a-phase injection mode (S270).

At the present time, the times of the second injection (second phase injection), which is the main injection, and the subsequent main injections are set to the injection times in the existing n-phase injection mode, respectively, as they are. Furthermore, the idle time between the injection time of the pre-energizing and the main injection immediately after which is set to a value determined in steps S110 and S120. For example, in the aforementioned example, the pre-energizing is the first injection (first phase injection), the third phase injection, and the seventh phase injection, and the injection time and the idle time each are set to the values determined in steps S110 and S120. Furthermore, the second phase, fourth phase, fifth phase, sixth phase, and eighth phase injections are set to the injection times upon the first to fifth phase injections in the existing main injection.

Furthermore, even in the case of the injection angle, the injection angles upon the injections corresponding to the second injection (second phase injection), which is the main injection, and the subsequent main injections are set to the injection angles of the existing n-phase injection mode, respectively, as they are. For example, in the aforementioned example, the injection angles of the second phase, fourth phase, fifth phase, sixth phase, and eighth phase injections corresponding to the existing main injection are set to the injection angles upon the first to fifth phase injections in the existing main injection. Furthermore, since the pre-energizing (in the aforementioned example, first phase, third phase, and seventh phase injections) is preformed before the main injection with the determined idle time interposed therebetween, it is not necessary to determine the injection angle separately.

When the injection time and the injection angle of each injection in the (n+1+α)-phase injection mode are determined by the injection mode calculator 15, the injector drive driver 12 generates a drive signal by use of information on the number of injection times, the injection time, and the injection angle, which are determined by the injection mode calculator 15 and transmits the drive signal to the injector drive semiconductor 11. As a result, the injector 120 is driven to perform the pre-energizing before the corresponding injection, in every first injection of the conventional multi-phase injection and every injection after the idle time exceeding the predetermined value (S280).

Figure 5:
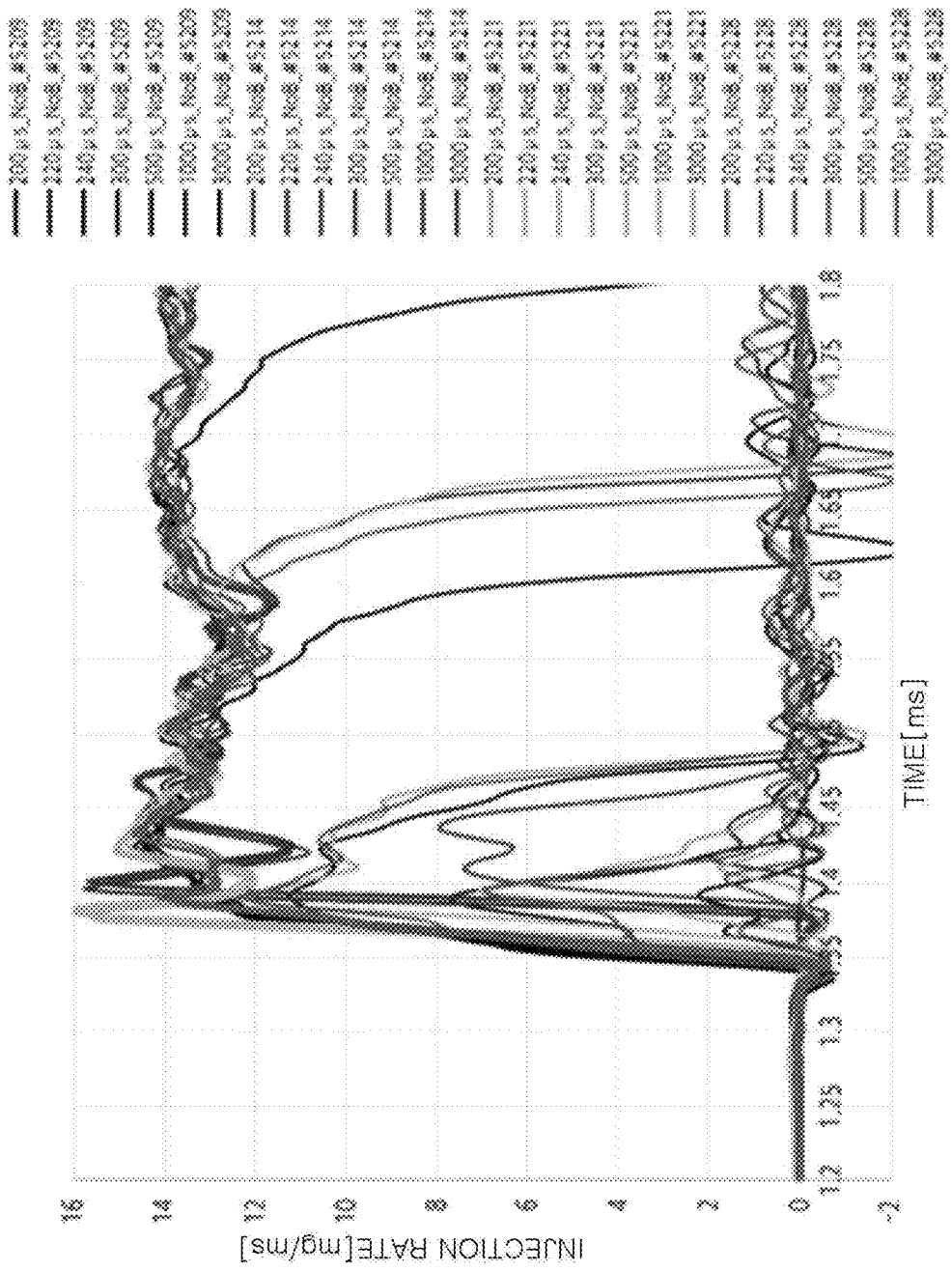
FIG. 5 is a graph illustrating an initial flow rate development behavior when the conventional fuel injection control method is performed.
Figure 7:
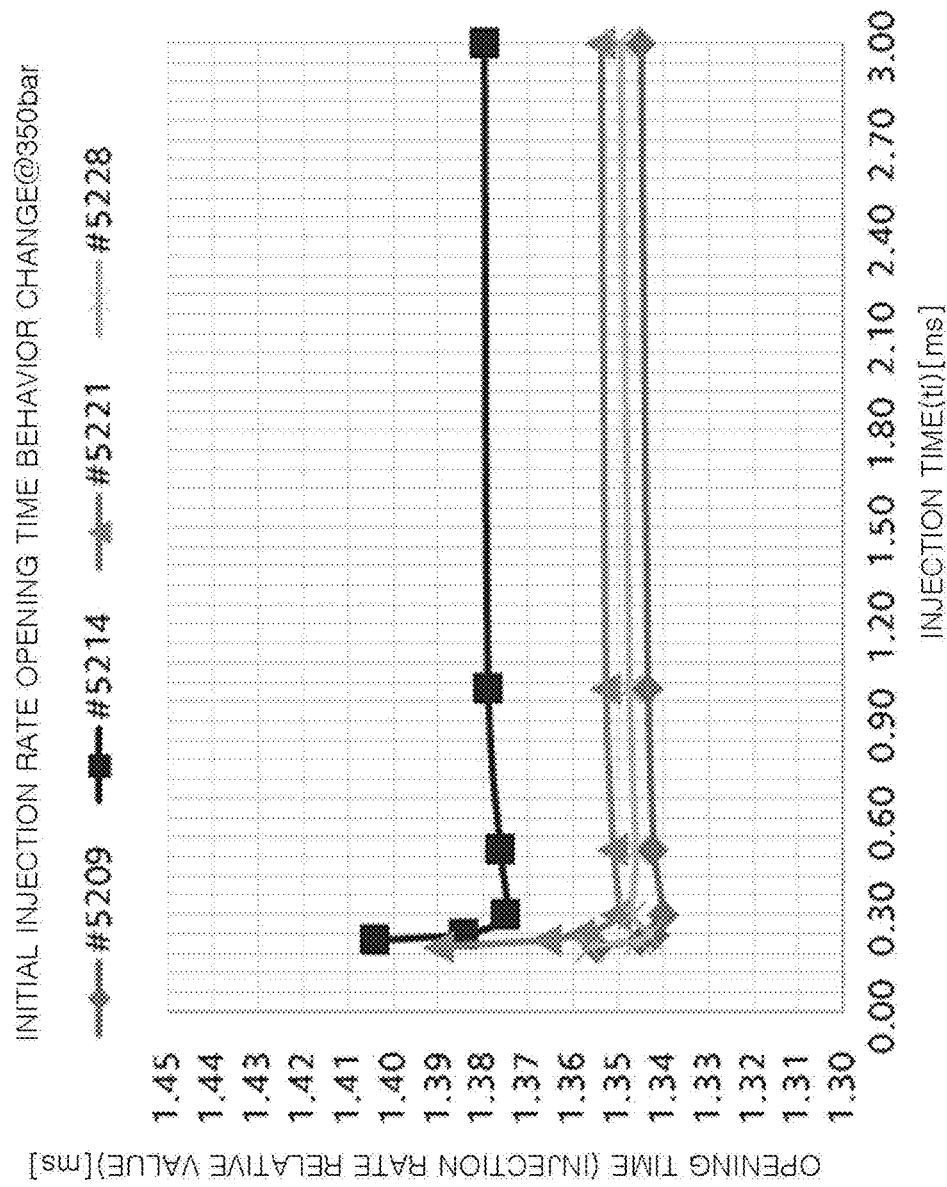
FIG. 7 is a graph illustrating the deviation of an opening time between the injectors when the conventional fuel injection control method is performed.

FIG. 5 is a graph illustrating an initial flow rate development behavior when the conventional fuel injection control method is performed, and FIG. 7 is a graph illustrating the deviation of the opening time between the injectors when the conventional fuel injection control method is performed.

Figure 6:
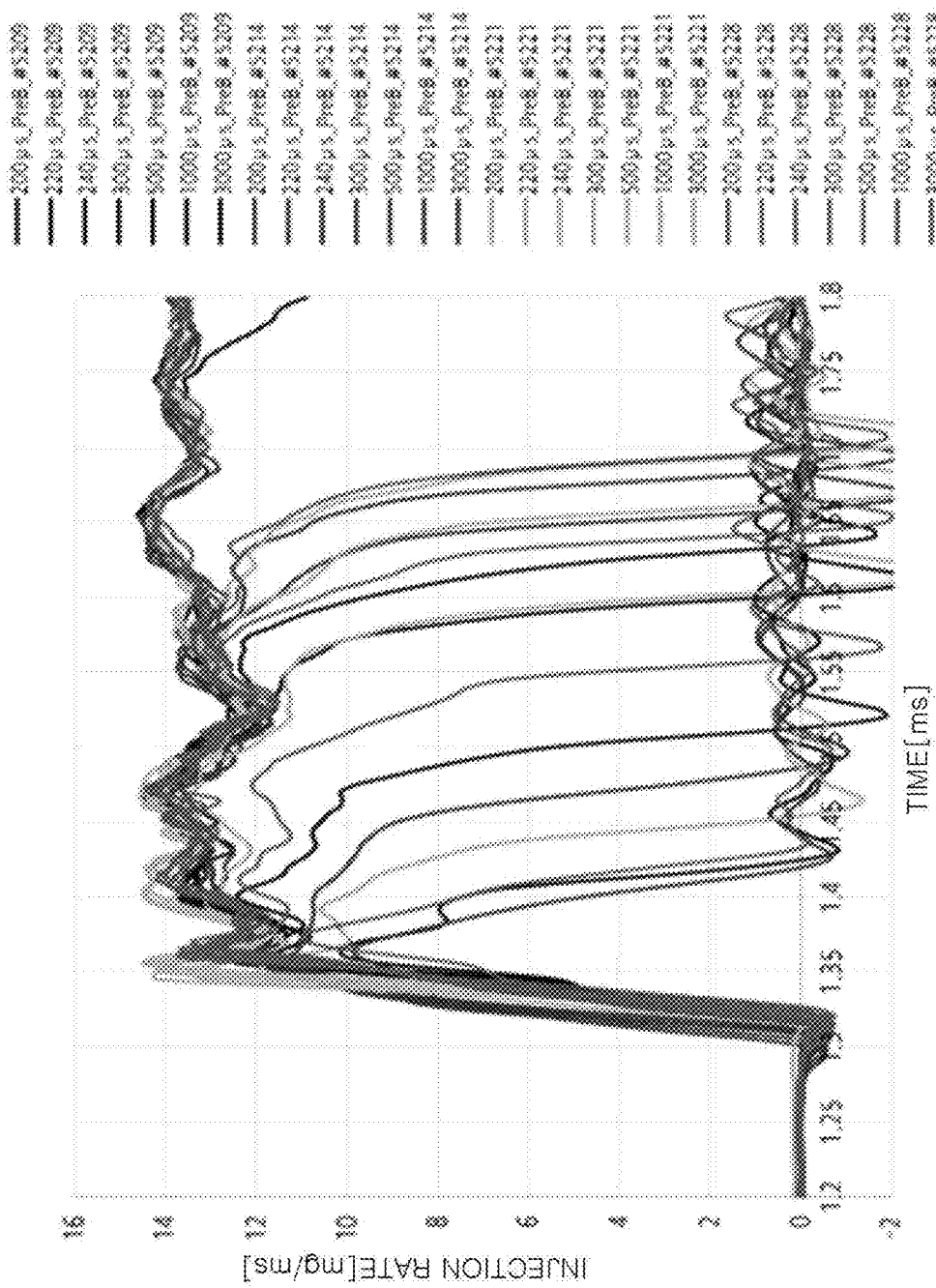
FIG. 6 is a graph illustrating an initial flow rate development behavior when the fuel injection control method according to an exemplary embodiment of the present invention is performed.

As illustrated in FIG. 5, according to the conventional fuel injection control method, it may be seen that as the injection time increases, the deviation of the initial flow rate development behavior between the injectors increases. For the present reason, as illustrated in FIG. 6, according to the conventional fuel injection control method, the deviation of the opening time between the injectors is large. Accordingly, it may be seen that the flow rate is formed unstably, in the ballistic section, such that when the injection time is short, the injector opening time may be abnormally increased or the flow rate may not be stably generated, and the generation of the flow rate may also be stopped in the meantime. Furthermore, as illustrated in FIG. 5, when the length of the injector opening time is different between when the injection time is short and when the injection time is long, there is a problem in that the injector opening time determined in a specific injection section may not be applied to other sections.

Figure 8:
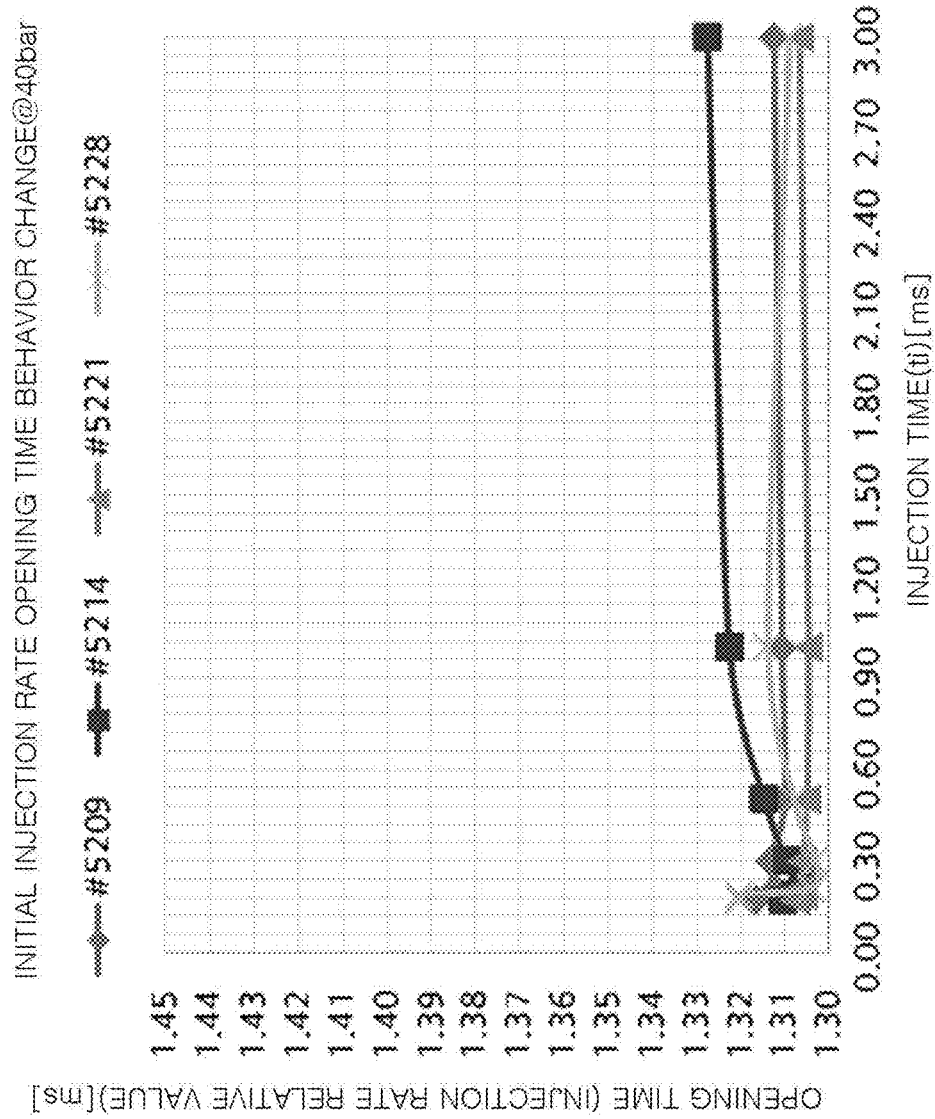
FIG. 8 is a graph illustrating the deviation of an opening time between the injectors when the fuel injection control method according to an exemplary embodiment of the present invention is performed.

FIG. 6 is a graph illustrating the initial flow rate development behavior when the fuel injection control method according to an exemplary embodiment of the present invention is performed for the same injector sample as in FIG. 5, and FIG. 8 is a graph illustrating the deviation of the opening time between the injectors when the fuel injection control method according to an exemplary embodiment of the present invention is performed.

On the other hand, according to FIG. 6, it may be seen that when the pre-energizing is performed according to the fuel injection control method according to the exemplary embodiment of the present invention for the same injector sample as in FIG. 5, the flow rate is stably generated even if the injection time is short. As a result, it may be confirmed that the flow rate is stably formed even in the ballistic section, and it may be seen that the injector opening time is kept constant regardless of the length of the injection time. Furthermore, as illustrated in FIG. 8, it may be seen that the deviation of the opening time between the injectors is also significantly improved.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A fuel injection control method of injecting fuel to a combustion chamber of an engine through an injector, the method comprising:
performing, by a controller electrically-connected to the injector, a main injection configured of controlling the injector to inject the fuel in a target injection fuel amount; and
performing, by the controller, a pre-energizing configured of driving the injector to inject the fuel in advance, before the performing of the main injection with a predetermined idle time interposed therebetween,
wherein the performing of the pre-energizing is configured of magnetizing an injector coil of the injector by applying a current to the injector during a predetermined pre-energizing time, in which a flow rate of the fuel is prevented from being generated by the pre-energizing, and
wherein the performing of the pre-energizing includes determining the predetermined pre-energizing time and the predetermined idle time according to a fuel pressure and an engine temperature.

2. The method of claim 1,
wherein the performing of the pre-energizing further includes determining whether the main injection is a single injection or a multi-phase injection, and
wherein when the controller determines the main injection as the single injection, an injection mode of the fuel is converted into a multi-phase injection, a first phase of the multi-phase injection is set to the pre-energizing, and a second phase of the multi-phase injection is set to the main injection.

3. The method of claim 2, wherein an operating mode of the first phase is based on a fuel injection angle determined in an exhaust stroke region.

4. The method of claim 2, wherein an injection mode, an injection time, and an injection angle of the second phase are determined based on the target injection fuel amount.

5. The method of claim 2, further including:
when the main injection is determined as the multi-phase injection, determining, by the controller, when idle times between injections of the multi-phase injection exceed a predetermined value,
wherein when all of the idle times between the injections of the multi-phase injection are equal to or less than the predetermined value, the pre-energizing is performed before the first fuel injection of the multi-phase injection.

6. The method of claim 5, wherein when at least one of the idle times between the injections of the multi-phase injection is greater than the predetermined value, the pre-energizing is performed before a corresponding fuel injection, in every first fuel injection of the multi-phase injection and every fuel injection after the idle time which is greater than the predetermined value.

7. The method of claim 5, wherein the operating mode upon the pre-energizing is based on a fuel injection angle determined in an exhaust stroke region.

8. The method of claim 5, wherein an injection mode, an injection time, and an injection angle of each injection in the multi-phase injection are determined based on a target injection fuel amount.

9. The method of claim 1, further including:
determining, by the controller, when a limp home mode, in which the fuel is injected in a forced low pressure mode, is executed due to malfunction of a fuel pump of a fuel system including the injector; and
stopping, by the controller, the performing of the pre-energizing, when the controller determines that the limp home mode is being executed.

10. A fuel injection control apparatus comprising:
an injector which is configured to inject fuel to a cylinder of an engine; and
a controller which is electrically-connected to the injector and configured to control the injector so that the fuel is injected from the injector by a target injection fuel amount,
wherein the controller is configured to perform a control of a pre-energizing, in which an injector coil of the injector is magnetized by applying a current to the injector during a predetermined pre-energizing time, in which flow rate of the fuel is prevented from being generated, with a predetermined idle time interposed therebetween, before a main injection in which the target injection fuel amount of the fuel is injected in the cylinder, and
wherein the controller includes:
a pre-energizing time and idle time calculator which is configured of determining the predetermined pre-energizing time and the predetermined idle time and the pre-energizing time and idle time calculator is configured to determine the predetermined pre-energizing time and the predetermined idle time according to a fuel pressure measured by a fuel rail pressure sensor and an engine temperature measured by a coolant sensor.

11. The fuel injection control apparatus of claim 10, wherein the controller includes:
an injection mode calculator which is configured of determining an injection time and an injection angle of the injector based on a number of injection times, an injection time and an injection angle of the main injection, and further based on a result determined by the pre-energizing time and idle time calculator; and
an injector drive driver which is configured to control the injection time and the injection angle of the injector, according to a determined result of the injection mode calculator.

12. The fuel injection control apparatus of claim 10, wherein when the controller determines the main injection as a single injection, an injection mode of the fuel is converted into a multi-phase injection, a first phase of the multi-phase injection is set to the pre-energizing, and a second phase of the multi-phase injection is set to the main injection.

13. The fuel injection control apparatus of claim 12, wherein an operating mode is based on a fuel injection angle determined in an exhaust stroke region.

14. The fuel injection control apparatus of claim 10, wherein when the main injection is determined as a multi-phase injection comprising a plurality of fuel injections, the controller is configured to determine when idle times between the plurality of fuel injections of the multi-phase injection exceed a predetermined value, and
wherein when all of the idle times between the plurality of fuel injections of the multi-phase injection are equal to or less than the predetermined value, the controller is configured to perform the pre-energizing before a first injection of plurality of fuel injections in the multi-phase injection.

15. The fuel injection control apparatus of claim 14, wherein when at least one of the idle times between the injections of the multi-phase injection is greater than the predetermined value, the controller is configured to perform the pre-energizing before a corresponding fuel injection, in every first fuel injection of the multi-phase injection and every fuel injection after an idle time which is greater than the predetermined value.

16. The fuel injection control apparatus of claim 10, wherein the controller is configured to determine when a limp home mode, in which the fuel is injected in a forced low pressure mode, is executed due to malfunction of a fuel pump of a fuel system including the injector; and
wherein the controller is configured to stopping the pre-energizing, when the controller determines that the limp home mode is being executed.

* * * * *